E. EMMERT.
Harvester Binder.

No. 19,137. Patented Jan. 19, 1858.

UNITED STATES PATENT OFFICE.

EZRA EMMERT, OF FRANKLIN GROVE, ILLINOIS.

IMPROVEMENT IN HARVESTERS.

Specification forming part of Letters Patent No. 19,137, dated January 19, 1858.

*To all whom it may concern:*

Be it known that I, EZRA EMMERT, of Franklin Grove, in the county of Lee and State of Illinois, have invented a new and useful Improvement in Grain-Harvesters; and I do hereby declare that the following is a full, clear, and exact description of the same, reference being had to the annexed drawings, making a part of this specification, in which—

Figure 1:
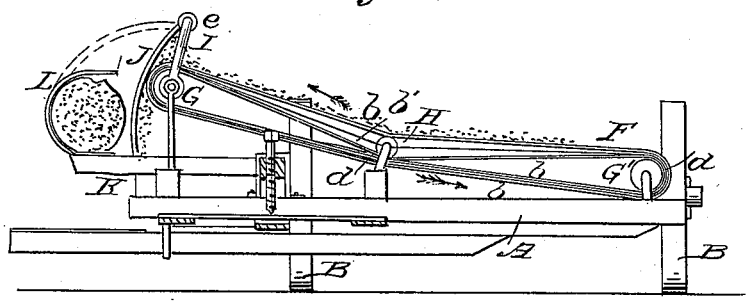
Figure 2:
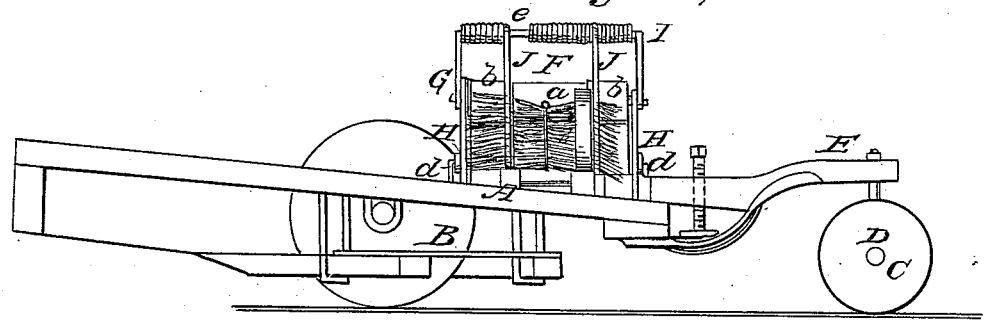
Figure 4:
Figure 3:
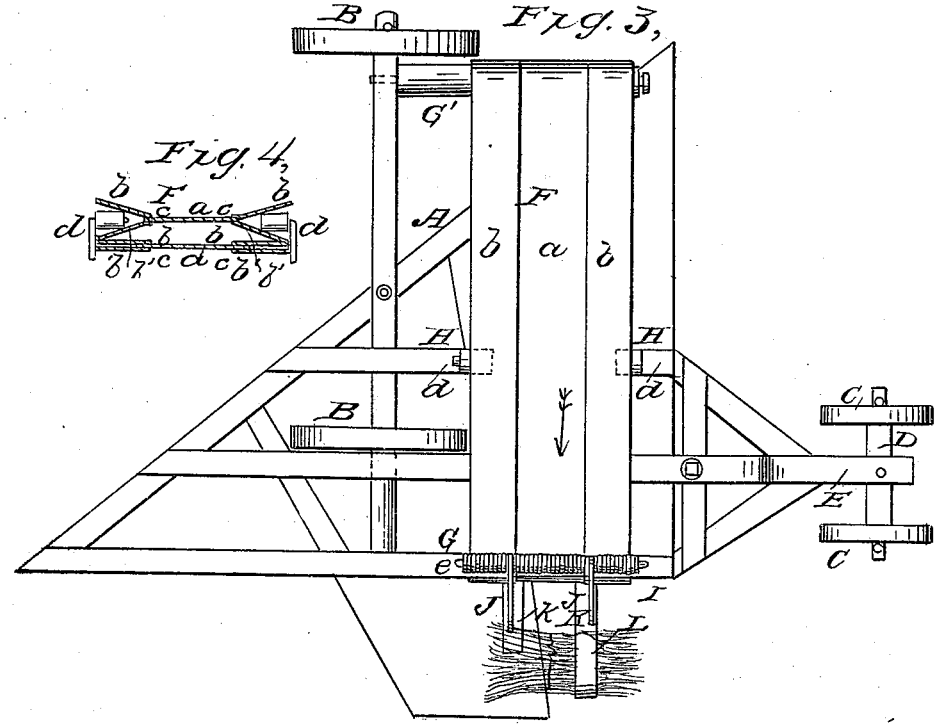

Figure 1 is a front view of my improvement, the draft-pole being bisected transversely, as indicated by the line $x\ x$, Fig. 3. Fig. 2 is a side view of the same. Fig. 3 is a plan or top view of same. Fig. 4 is a detached transverse section of the endless apron.

Similar letters of reference indicate corresponding parts in the several figures.

The invention consists in the employment or use of a peculiarly-constructed endless apron, retaining-hooks, receiving-hook, and binders' platform, arranged substantially as hereinafter shown, whereby the cut grain is removed from the platform, retained at one end until a sufficient quantity has collected to form a sheaf, and then allowed to be readily removed to the receiving-plate for binding.

To enable those skilled in the art to fully understand and construct my invention, I will proceed to describe it.

A represents the frame of the machine, which may be constructed in any proper manner. This frame is mounted on two wheels, B B, and its front part is supported by wheels C C, which are placed on an axle, D, connected with the draft-pole E. The sickle or cutting device (not shown) is attached to the front part of the frame A, and may be of usual construction and driven in the usual manner.

F is an endless apron, which is placed on the platform or front part of the frame A. This apron passes around rollers G G', one of which, G', is quite close to the frame, the other one, G, being elevated some distance above it. The apron F extends the whole width of the frame. (See Figs. 1 and 3.) The apron F is constructed in a peculiar manner, as shown in Fig. 4. It is formed of five longitudinal parts or strips, $a\ b\ b\ b'\ b'$. The strip $a$ is at the center of the apron, and may be formed of canvas or other suitable material. The strips $b\ b'$ are at the sides or edges, two strips being at each side, the inner edges being secured to the edges of the strip $a$, as shown at $c$, one strip, $b$, being directly over the other, $b'$. (See Fig. 4.) The outer edges of the strips $b\ b'$ are not connected, but allowed to be open to receive rollers H H, the axes $d$ of which are attached to the platform in such a way as to permit the rollers to fit between said strips. (See Fig. 2.) The rollers H retain the apron quite close to the framing—that is, the portion directly back of the sickle or cutting device—so that the cut grain may readily fall thereon, and it will be seen that the strips $b$ serve as covers to the rollers and prevent the straw being drawn underneath them, the rollers bearing on the strips $b'$. This will be understood by referring to Fig. 4. The strips $b\ b'$ may be formed of leather or other durable material.

At the elevated end of the apron F, and to the axis of the roller G, a rod, I, is attached, so bent as to form a horizontal part, $e$, parallel with the roller G. On this part $e$ the upper ends of curved rods J are fitted or placed so that they may hang or swing freely thereon. These rods bear against the elevated end of the apron F in consequence of their own gravity, the part $e$ of the rod I having such a relative position with the roller G as to obtain this result. (See Fig. 1.)

To the frame A two bars, K K', are attached so as to project outward a short distance from it just below the elevated end of the apron F. (See Fig. 1.) To one of these bars, K, and at its outer end, a curved plate, L, is attached. (See Figs. 1, 2, and 3.) This plate is curved in semicircular form, and is of sufficient capacity to receive an amount of straw or grain necessary to form proper-sized sheaves.

The operation is as follows: As the machine is drawn along the cut grain (shown in red) falls on the apron F, which is moved in the direction indicated by the arrows and driven in any proper manner from one of the wheels B. The grain, as it reaches the upper part or elevated end of the apron F, is retained by the curved rods or hooks J J, and when a sufficient quantity is collected or gathered thereon an attendant, who stands on a platform, M, attached to the frame A, presses it down with his hands within the hook or plate L and places the band around the sheaf. A sufficient quantity of grain will be again collected at the elevated end of the apron, and when the bound sheaf is thrown from the machine the attendant presses down another quantity within the hook or plate L, to be bound as before. In pressing down the grain the rods or hooks J of course are forced outward, as indicated by the dotted lines, and return to their original position by their own gravity.

The bands I propose to construct of wire or metal; but any proper material may be used for that purpose.

Having thus described my invention, what I claim as new, and desire to secure by Letters Patent, is—

The peculiarly-constructed apron F and retaining-hooks J J, in combination with the binding-hooks L and platform M, the whole being constructed and arranged for joint operation, in the manner and for the purposes set forth.

EZRA EMMERT.

Witnesses:
EDWIN W. HINE,
J. W. ROBERTS.